United States Patent Office 3,160,001
Patented Dec. 8, 1964

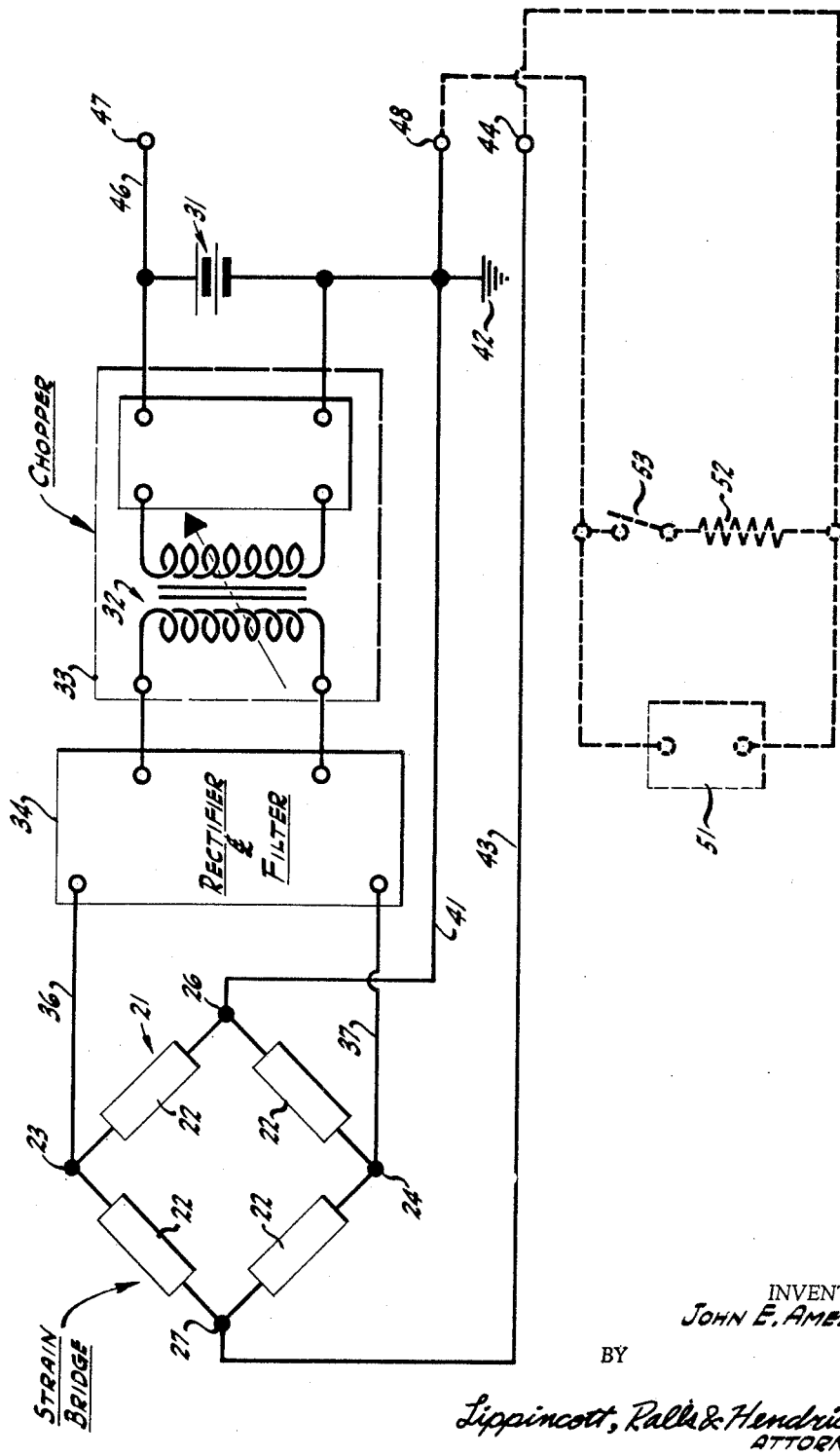

3,160,001
STRAIN GAUGE ISOLATION CIRCUITRY
John E. Ames, Jr., Altadena, Calif., assignor to Fairchild Camera and Instrument Corporation, Syosset, Long Island, N.Y., a corporation of Delaware
Filed Aug. 21, 1961, Ser. No. 132,978
8 Claims. (Cl. 73—88.5)

The present invention relates to an improvement in bridge circuitry, particularly as related to semiconductor strain gauge bridges.

It is well known that semiconductor strain gauges have wide applicability, owing in part to the extreme sensitivity thereof, and it is also known that the utilization of semiconductor sensing elements in a bridge circuit provides material advantage over simple, individual unit application. One difficulty encountered in the utilization of strain bridges, for example, lies in the inability of this type of circuitry to be employed in connection with potentiometer applications. In the accomplishment of electrical measurements, it is oftentimes specified that potentiometer-type circuits shall be employed, and yet the very nature of bridge circuits of the four-arm bridge variety normally precludes this type of connection. Inasmuch as a Wheatstone bridge-type circuit employs energization or excitation across one bridge diagonal to produce output signals across the other diagonal, it then follows that any attempt to employ a three-wire circuit with such a bridge is unavailing, for a short will then occur across one of the bridge arms.

The present invention is particularly directed to the solution of this problem, so that semiconductor strain gauges, for example, may be employed in Wheatstone bridge circuits for maximum sensitivity and utility, while at the same time being adapted for potentiometer-type applications. In brief, the present invention provides for complete electrical isolation of the input of the bridge from the output thereof. This is herein accomplished by the conversion and reconversion of input voltage, so as to afford the requisite isolation. In this manner, it is then possible to electrically join, as by grounding, one of the input leads and one of the output leads from the bridge formed of semiconductor sensor elements. As regards the applicability of this particular result to measuring circuits, it is believed that same is readily apparent to those skilled in the art. Not only are potentiometer-type applications of strain gauges often specified for various types of applications, but furthermore, it is well known that the null-type measurement available therefrom is highly desirable in the attainment of extreme accuracies.

The present invention is illustrated as to one preferred embodiment thereof in the accompanying drawing, wherein the sole figure schematically depicts appropriate electrical circuitry accomplishing the purposes hereof.

Considering now the present invention in somewhat greater detail, and referring to the drawing, there will be seen to be indicated therein a strain bridge 21 formed of a plurality of semiconducting sensor elements 22 electrically joined together in a four-arm or Wheatstone bridge configuration. In accordance with conventional bridge circuitry, there are provided input terminals 23 and 24 at opposite ends of one diagonal end of the bridge for excitation of the elements thereof, and there are provided output terminals 26 and 27 at opposite ends of the alternate bridge diagonal. It will be appreciated that with the application of an input excitation voltage between the input terminals 23 and 24, there will then be produced an output voltage across the opposite bridge diagonal proportional to the differences in the resistances of the bridge arms.

As regards the composition of the strain bridge, it is herein contemplated that same may be formed of conventional semiconducting sensor elements. Furthermore, these sensor elements may be mounted as desired to experience applied stress, so that the strains thereof will produce variations in the electrical characteristics of these elements. Consequently, the application of stresses to the sensor elements will produce a variation in the resistances thereof, and consequently will cause a bridge unbalance so that the voltage appearing between the output terminals of the bridge will be indicative of the applied stress. Although any desired type of sensor elements may be employed herein, it is desirable to utilize diffused strip sensors of the type set forth in the copending patent application of Wendell M. Lafsky entitled "Semiconductor Strain Gauge," and filed in the U.S. Patent Office on August 16, 1960, with Serial No. 50,510. This above-identified patent application, assigned to the same assignee as this application, describes sensor elements wherein the sensing portion of the sensing element is composed of minute diffused zones in small semiconducting wafers, and particularly advantageous results have been attained with this type of element. Furthermore, this type of sensor element may, if desired, be directly bonded to beams, or the like, as are commonly utilized in pressure transducers, for example.

As regards the application of excitation voltage to the strain bridge 21, there may be employed any conventional direct current power supply, herein indicated as a battery 31. In distinction to conventional bridge applications and connections, the present invention provides for the application of this direct current voltage to conversion means for changing same to an alternating current voltage. These means may include a chopper circuit formed, for example, of a pair of transistors appropriately connected in conventional manner across a saturable core transformer 32. This chopper circuit 33, including the saturable core transformer 32, produces an alternating current voltage which is herein applied to a rectifier and filter circuit 34. From the rectifier and filter circuit 34 there is thus produced a direct current voltage which is connected by leads 36 and 37 across the input diagonal of the strain bridge at the input terminals 23 and 24 thereof. Any suitable chopper circuit and rectifier and filter circuit may be employed in the present invention, so that no details or extensive explanation thereof is herein included. It is particularly noted, however, that the combination of chopper and rectifier to convert the input direct current voltage to an alternating current voltage and then to reconvert this alternating current voltage back to the direct current voltage for excitation of the strain bridge, does provide for full and complete isolation of the strain bridge from the direct current power supply 31. While it is possible for the above-noted circuits to take any one of a wide variety of configurations, it is desirable in the present application for same to be formed as transistorized circuits in order to minimize the physical size of same. This is highly advantageous in connection with strain bridge applications, for in many instances only an extremely limited physical space is available within which to employ the strain bridge, and under certain circumstances it is advantageous to include the chopper and rectifier circuitry in the transducer unit of the bridge itself.

Considering now the operation of the present invention, it is first noted that the sensor elements 22 of the strain bridge 21 are positioned to experience stresses that are to be indicated or measured. The strain bridge is energized by the application of a voltage across the input terminals 23 and 24 thereof. With the power supply 31 operating, it will be seen that there is then produced in the chopper circuit 33 an alternating current voltage which is then applied to the rectifier and filter circuit 34 to impress a direct current excitation voltage between the excitation leads 36 and 37. These leads are connected to the input terminals of the strain bridge, and consequently do apply excitation across the bridge. The application of stress to the bridge or to the individual elements thereof will vary the electrical characteristics of such elements, so that the voltage appearing at the output terminals 26 and 27 of the bridge will vary in relation to the magnitude of this applied stress.

The substantially complete electrical isolation provided between the battery or power supply 31 and the input of the strain bridge will be seen to afford a highly desirable isolation between excitation source and output of the bridge. This isolation is highly desirable for elimination of noise signals, for example. The present invention is also adapted for the electrical connection of one side of the direct current power supply 31 to one of the output terminals of the strain bridge. This is indicated in the drawing by the conductor 41 extending from the bridge output terminal 26 to the negative side of the battery 31. In actual practice, it is oftentimes desirable to form this connection through electrical ground, and thus there is indicated a ground connection at 42 with this lead 41 connected thereto. The other output terminal 27 of the strain bridge is connected through a conductor 43 to a measurement terminal 44. The positive side of the direct current power supply 31 is connected by a conductor 46 to the input of the chopper 33, and also to an indicating terminal 47. An additional or third output terminal 48 is connected to ground at 42.

Insofar as the accomplishment of actual indication or measurement with the strain bridge circuitry of the present invention, and insofar as compensation of the bridge is concerned, such forms no part of the present invention and consequently is not herein discussed in detail. The three output terminals afford the possibility of employing a potentiometer-type measurement wherein an external power supply in parallel with a resistor is connected across the exterior terminals and a null seeking device is connected to the intermediate terminal and to a wiper on the exterior resistor. An indicator on this wiper then provides the output indication as determined by the wiper position for balance. In such an application, it is desirable to balance input and output of the transducer within predetermined limits, as by the transformer ratio and an amplifier in the bridge output 43, if necessary.

Although the indicating means employed with the invention is not of prime importance herein, it is noted that voltage measurement is also possible, as indicated by the dashed circuitry of the drawing. As shown, a voltmeter or the like 51 may be connected in parallel with a resistor 52 and series switch 53 across the output terminals 44 and 48. In such case one side of the voltmeter is grounded, as is often desirable in measurement.

A wide flexibility of measurement is thus available with the present invention and it is particularly noted that conventional bridge circuitry does not afford this flexibility. Connection of a supply and output terminal of a conventionally wired bridge circuit produces an electrical short which renders the bridge inoperative as such. The present invention, on the other hand, provides for the employment of a Wheatstone-type measurement bridge, so as to obtain all of the known advantages of this type of circuitry, while at the same time providing for the joinder of one power supply and output lead so as to make this type of bridge circuitry applicable to potentiometer-type applications.

Further to the operation of the present invention, it is noted that the turns ratio of the transformer 32 in the chopper circuit 33 may be adjusted to provide a desired voltage supply to the transducer for any given input voltage within limits determined by the circuitry. Consequently, the present invention provides, for example, that the input voltage may be made equal to the full-scale output voltage, and this is, in fact, the situation contemplated in the illustrated embodiment of the invention.

The present invention provides circuitry for adapting Wheatstone bridge-type measuring circuits to three-wire systems. This is herein accomplished through the utilization of only a simple and conventional equipment requiring but little physical space and operating with great dependability. Isolation herein afforded between the direct current power supply and the measurement bridge does make it possible for the electrical connection of one input and one output lead, despite the fact that a four-arm bridge circuit is applied. The excitation voltage existing between the excitation leads 36 and 37 is completely and fully isolated from the power supply voltage 31 by the transformer 33, and consequently the common lead 41 does not provide an electrical short across one arm of the strain bridge. As above noted, it is possible to form the chopper and rectifier and filter circuitry from conventional and miniaturized elements. Preferably, the chopper includes a pair of transistors connected to the small saturable core transformer 32, so that this chopper functions in the same manner as other circuits of like name. The rectifier and filter 34 may be likewise formed of semiconducting elements to minimize the size thereof and to maximize the reliability of same. This entire isolation portion of the present invention may then, if desired, be physcally disposed within the transducer unit of a strain gauge, while yet maintaining very minute exterior dimensions thereof.

What is claimed is:

1. An improved measuring circuit comprising a Wheatstone bridge circuit having output terminals at opposite ends of one bridge diagonal and input terminals at opposite ends of the alternate bridge diagonal, a direct current power supply, electrical isolation circuitry between said power supply and the input terminals of said bridge providing a conversion of the output of said direct current power supply to an alternating current and reconverting this alternating current to a direct current excitation voltage for said bridge, and three output leads extending one from an output terminal of said bridge, one from one side of said power supply, and one from a common connection of the other side of said power supply and the other output terminal of said bridge.

2. Measuring circuitry as set forth in claim 1, further defined by said isolation means including a chopper circuit having a saturable core transformer, and a rectifier circuit connected between said transformer and the input terminals of said bridge with the transformer having a predetermined transformation ratio to establish a substantial equality between power supply voltage and full output voltage between the output terminals of the bridge.

3. An improved strain gauge comprising a four-arm bridge circuit including at least one semiconducting sensor element therein and adapted to receive excitation voltage across one bridge diagonal and to produce output signals across the alternate bridge diagonal, a direct current power supply, an isolation circuit including a converter and rectifier connected between said direct current power supply and the opposite ends of the excitation diagonal of said bridge for isolation of the bridge from the power supply, a first output connection extending from one side of said power supply, a second output extending from one end of the output diagonal of said bridge, and a third output extending from a common connection of the other end of said output bridge diagonal and the other side of said power supply.

4. Strain bridge circuitry as defined in claim 3, further characterized by a variable turn saturable transformer included in said isolation circuitry for controlling the ratio of direct current supply voltage to maximum bridge output voltage.

5. Strain gauge circuitry as defined in claim 3, further characterized by said isolation circuitry including a saturable core transformer having a predetermined turns ratio establishing a substantial equality between power supply voltage and maximum output voltage across the output diagonal of said bridge, and means electrically grounding said third output for adaptation of the bridge circuit to potentiometer-type applications.

6. An improved strain gauge circuit comprising a strain bridge having a plurality of semiconducting sensor elements connected in a Wheatstone bridge circuit for the variation of resistances of such elements with the application of stresses thereto, a direct current power supply, a chopper circuit connected to the output of said direct current power supply and including a saturable core transformer, a rectifier circuit connected to said transformer for producing a direct current output, means connecting the output of said rectifier across an excitation diagonal of said strain bridge, output leads extending from opposite ends of the alternate bridge diagonal with one of said leads being electrically joined to one side of said direct current power supply, and a further output lead extending from the other side of said power supply to establish a three-wire output system for the strain bridge circuitry.

7. An improved strain gauge circuit as set forth in claim 6, further characterized by the saturable core transformer of said chopper circuit having a variable turns ratio with such ratio adjusted to produce a substantial equality between power supply voltage and the maximum output voltage of the bridge, and means electrically grounding one side of said power supply and one output terminal of said strain bridge otherwise connected together as an output lead of the strain gauge.

8. An improved strain gauge circuit comprising a direct current power supply, a plurality of semiconducting sensor elements connected in a four-arm bridge circuit with output terminals at opposite ends of one bridge diagonal and input terminals at opposite ends of the alternate bridge diagonal, a chopper circuit connected across said power supply and including a transformer having an alternating current output, a rectifier connected between said transformer output and the input terminals of said bridge for applying direct current excitation to said bridge, and measurement terminals connected to said bridge output terminals whereby bridge output is fully isolated from said power supply.

References Cited in the file of this patent
UNITED STATES PATENTS

| | | |
|---|---|---|
| 1,448,583 | Van Der Bijl | Mar. 13, 1923 |
| 2,775,118 | Legge et al. | Dec. 25, 1956 |
| 2,915,710 | Schiewe et al. | Dec. 1, 1959 |
| 2,920,270 | Saw | Jan. 5, 1960 |
| 3,005,163 | Dulberger et al. | Oct. 17, 1961 |
| 3,049,685 | Wright | Aug. 14, 1962 |

OTHER REFERENCES

Dunn, C. H., and Barker, H. J.: "Electrical Measurements Manual," 1962, Prentice-Hall Inc., page 85.